United States Patent
Davis et al.

[15] 3,670,564
[45] June 20, 1972

[54] ALTITUDE SIMULATION CHAMBER FOR ROCKET ENGINE TESTING

[72] Inventors: John W. Davis; Herschel W. Belew, Jr., both of Huntsville, Ala.

[73] Assignee: The United States of America as represented by the Administrator of the National Aeronautics and Space Administration

[22] Filed: June 21, 1971

[21] Appl. No.: 154,935

[52] U.S. Cl. ..................................... 73/117.1, 73/432 SD
[51] Int. Cl. ...................................................... G01m 15/00
[58] Field of Search .................................. 73/117.1, 432 SD

[56] References Cited

UNITED STATES PATENTS 3,149,775   9/1964   Pagano ............................. 73/117.1 X
3,199,343   8/1965   Childs et al. ........................... 73/117.1

Primary Examiner—Jerry W. Myracle
Attorney—L. D. Wofford, Jr. et al.

[57] ABSTRACT

A vacuum chamber in which a scale model of the rocket engine base area of a space vehicle is mounted and fired in short duration runs for testing the model under simulated, high-altitude pressure conditions. To dissipate the engine exhaust energy, and particularly the starting shock wave produced when the engine is fired, an energy-absorbing compartment is provided within the vacuum chamber which compartment is made of cryogenically cooled metal honeycomb panels supported by the wall of the vacuum chamber. The cells of the honeycomb panels are opened on the inner side of the panels to present a large, cold and confining surface area to dissipate the energy of the exhaust gas molecules by capturing and freezing the molecules within the honeycomb cells.

10 Claims, 5 Drawing Figures

JOHN W. DAVIS
HERSCHEL W. BELEW, JR.
INVENTORS

BY Wayland H. Riggins
ATTORNEY

JOHN W. DAVIS
HERSCHEL W. BELEW, JR.
INVENTORS

BY *Wayland H. Riggins*

ATTORNEY

JOHN W. DAVIS
HERSCHEL W. BELEW, JR.
INVENTORS

BY *Wayland H. Riggins*

ATTORNEY

ALTITUDE SIMULATION CHAMBER FOR ROCKET ENGINE TESTING

ORIGIN OF THE INVENTION

The invention described herein was made by employees of The United States Government and may be manufactured and used by or for The Government for governmental purposes without the payment of any royalties thereon or therefor.

BACKGROUND OF THE INVENTION

This invention relates generally to engine testing and more particularly to an altitude simulation chamber for testing rocket engines.

One method of testing rocket engines that are to be fired in the very high altitudes of space is to mount a model of the engine and associated base area of a space vehicle within an altitude simulation chamber and fire the engine in short test runs of several milliseconds. This is known as the short duration or impulse mode of testing. To simulate space environment, very low pressures are produced in the simulation chamber by mechanical pumping, oil diffusion pumping and cryogenic pumping. Typically the simulation chamber is evacuated prior to engine test firing by mechanical and oil diffusion pumps and cryogenic pumping is used to condense or freeze the engine exhaust gases introduced into the chamber during the test firing.

When the rocket engine fires within the simulation chamber a starting shock wave system proceeds downstream and very quickly contacts and reflects from the wall of the simulation chamber. When this disturbance returns to the test model and the various instruments installed thereon the test data provided by the instruments immediately becomes invalid and the useful run time of the test is concluded. Therefore, in order to increase the useful run time and thus the value of this type of engine testing it is necessary to remove enough energy from the starting shock wave at the walls of the simulation chamber so that the effects of the shock wave returning to the test model will be negligible.

Prior art altitude simulation chambers for rocket engine testing utilize various mechanical, diffusion and cryogenic pumping means for maintaining low pressures and temperatures within the simulation chamber. However, the cryogenic pumping effect provided by prior devices is not deemed adequate for dissipating the starting shock wave produced when the engine is fired. Minimizing the effect of this shock wave is particularly important in the short duration mode of testing wherein various test instruments are installed on the test model to obtain data under conditions simulating a space environment.

SUMMARY OF THE INVENTION

The invention comprises a vacuum-tight chamber including pump means for evacuating the chamber. The chamber also includes means for mounting a test model within the chamber. When mounted in the chamber, the engine exhaust nozzle of the test model is directed into an energy-absorbing compartment made of honeycomb panels that are cryogenically cooled by passing cryogenic fluid through coolant passages incorporated in the panels. The cells of the honeycomb panels open inwardly of the energy-absorbing compartment providing a continuous cryogenically cooled surface of open cells that constitute a means for capturing and freezing exhaust gas molecules. The engine starting shock wave is thus largely dissipated by the honeycomb panels and does not reflect from the panels with enough energy to invalidate the data obtained from the test instruments mounted on the test model.

Accordingly, it is a general object of the present invention to provide an improved altitude simulation test facility for short duration rocket engine testing.

A more specific object of the invention is to provide an altitude simulation chamber having means for quickly dissipating the starting shock wave produced when the test engine is fired and thereby increase the useful test run time.

Another object of the invention is to provide an altitude simulation chamber for short duration rocket engine testing that will permit useful test run times comparable to larger and more expensive testing chambers known in the prior art.

These and other objects and advantages of the invention will become apparent upon reference to the following specification, attendant claims and drawing.

DESCRIPTION OF THE PREFERRED EMBODIMENT

Figure 1:
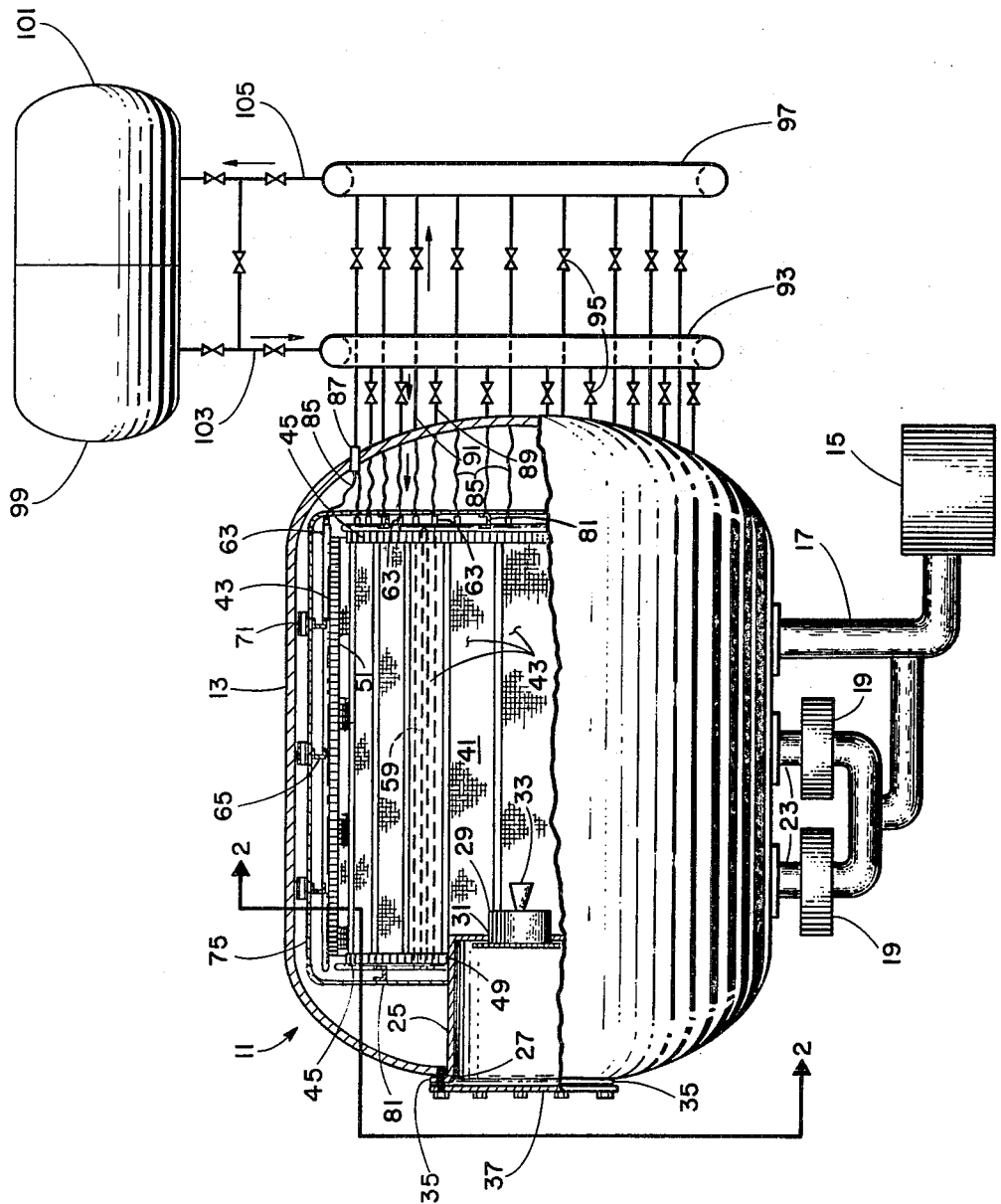
FIG. 1 is a view, partially in section, of an altitude simulation chamber employing the present invention with a schematic showing of the cryogenic fluid flow system associated with the chamber.

The altitude simulation testing facility shown in FIG. 1 comprises an elongated vacuum-tight cylindrical chamber 11 having an outer metallic wall 13. It is understood that the chamber 11 is constructed to provide a vacuum-tight enclosure during engine testing operations and all openings in the chamber are provided with appropriate sealing means. Evacuation of the chamber 11 is accomplished by a mechanical roughing pump 15 connected to the inside of the chamber 11 through piping 17 and oil diffusion pumps 19 that are connected to the inside of the chamber through pipes 23. As is well understood in the art, the mechanical pump 15 is used for achieving initial relatively rapid pressure reduction within the chamber 11 and the oil diffusion pumps 19 are used for further reduction of the chamber pressure until the required vacuum for test purposes is established within the chamber. The number of pumps employed will depend upon the characteristics of the particular facility design and the testing requirements.

A tubular receptacle 25 is installed in an opening 27 in one end of the chamber 11 for receiving a model 29 of the engine base area of a space vehicle. The model 29 is supported in an opening 31 in the inner end of the tubular receptacle 25 with an engine nozzle 33 of the model projecting well into the chamber 11. The outer end of the tubular receptacle 25 has an annular flange 35 that constitutes a seat for a gasketed vacuum door 37 that is releasably secured to the flange 35 and closes the outer end of the receptacle 25 in a vacuum-tight manner.

An energy-absorbing compartment 41 is provided centrally within the chamber 11. The compartment 41 is located concentrically with the outer wall 13 of the chamber 11 and comprises a series of adjacent metallic honeycomb panels 43 extending longitudinally of the chamber 11 and a series of adjacent vertical or transverse honeycomb panels 45 located at opposite ends of the panels 43 so that the energy-absorbing compartment 41 formed by the honeycomb panels is generally an enclosed cylinder. An opening 49 is formed in the compartment near the door end of the chamber 11 permitting the tubular receptacle 25 and the test model 29 to project into the compartment 41.

Figure 3:
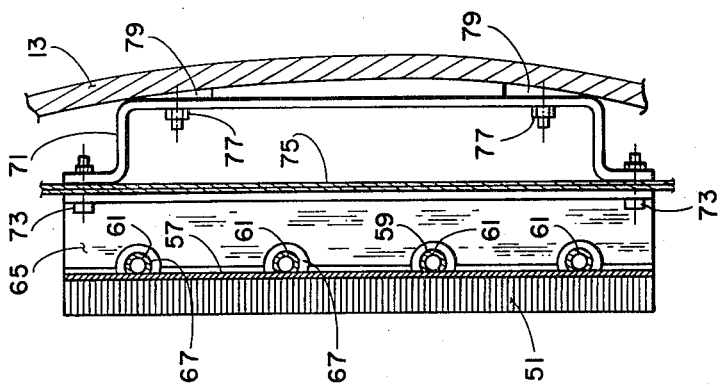
FIG. 3 is an enlarged sectional view of a typical honeycomb panel used in the invention.
Figure 2:
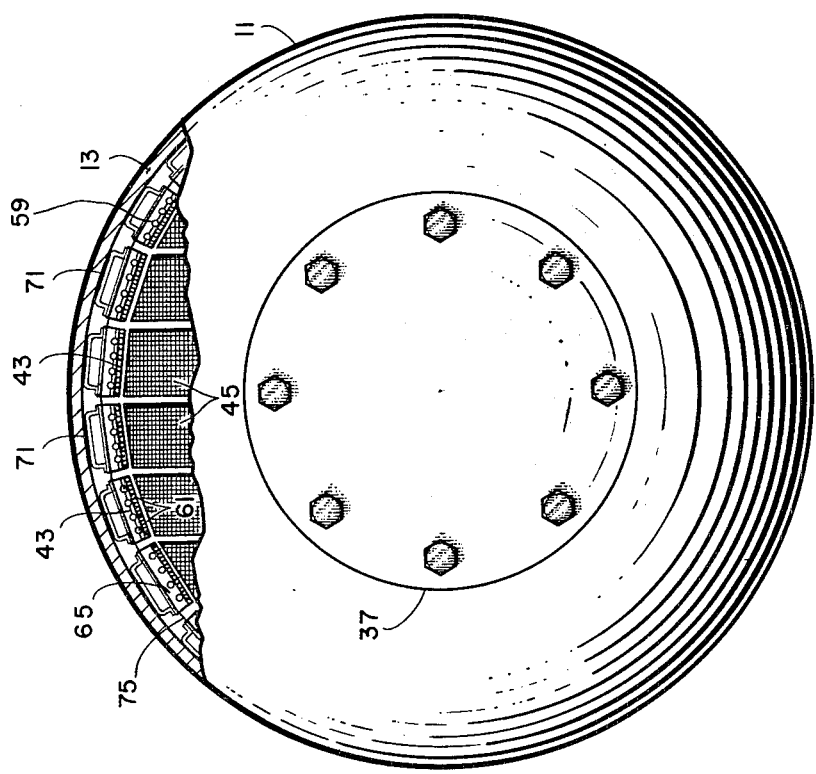
FIG. 2 is a view taken along line 2—2 of FIG. 1.
Figure 4:
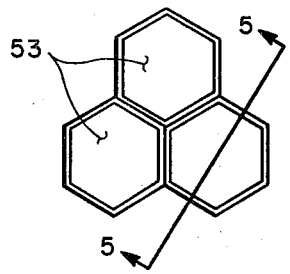
FIG. 4 is a view of the open ends of a plurality of adjacent honeycomb cells typical of the honeycomb panels used in the present invention.
Figure 5:
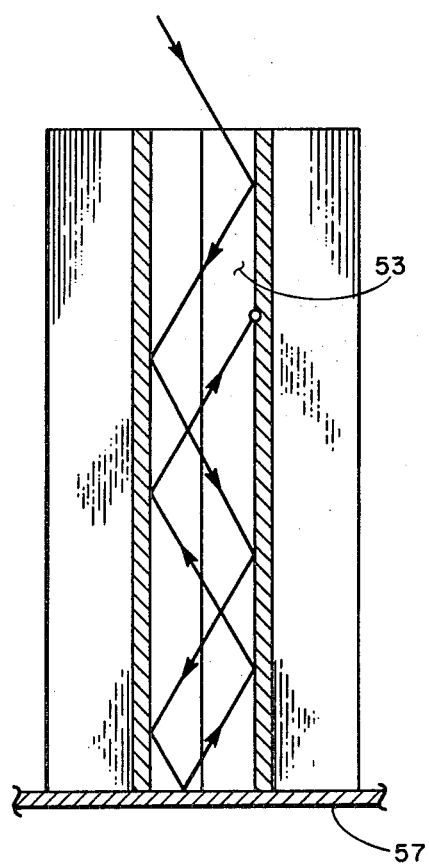
FIG. 5 is an enlarged sectional view through a honeycomb cell of FIG. 4 taken along line 5—5 and illustrating the capture sequence of an engine exhaust gas molecule.

The honeycomb panels 43 and 45 are constructed for cryogenic cooling by circulating cryogenic fluid, such as liquid nitrogen, through conduits incorporated in the panels. As shown in FIG. 3, the honeycomb panels 43 and 45 include a section 51 of aluminum honeycomb cells 53 (FIGS. 4 and 5) bonded on one side to an aluminum backing plate 57 that acts as a heat sink for the honeycomb section 51. The bonding between the honeycomb section 51 and the heat sink plate 57 is preferably epoxy material filled or mixed with aluminum powder to enhance heat conductivity. Integrally formed with the heat sink plate 57 is a conduit 59 that extends continuously back and forth lengthwise from one end of the panel to the other to provide a plurality of conduit lengths 61 uniformly spaced over the width of the panel. In the embodiment disclosed the conduit 59 starts at one end of a panel and extends continuously the length of the panel four times (see conduit 59 indicated in phantom line on one panel in FIG. 1) and terminates at the same end of the panel so that laterally spaced ends 63 are provided to connect with a system of cryogenic flow lines to be discussed hereinafter.

The longitudinal panels 43 have longitudinally spaced channels 65 extending laterally of the panels and being welded to the backing panel 57. Notches 67 in the channels 65 receive the conduit lengths 61. Hat-shaped brackets 71 are coextensive with the channels 65 and are fastened thereto with bolts 73 (FIG. 3). A multilayer radiation shield 75 is clamped between the channels 65 and the brackets 71 and substantially surrounds the energy-absorbing compartment 41 to reduce radiant heat transfer between the test chamber wall 13 and the panels. The brackets 71 are connected by bolts 77 to the test chamber wall 13 with thermal insulators 79 employed to minimize heat conduction between the wall 13 and the honeycomb panels 43.

The vertical panels 45 are constructed in the same manner as the panels 43 and are of appropriate lengths to substantially close the ends of the energy-absorbing compartment 41. Vertically spaced transverse channels 81 (FIG. 1) are connected to the vertical panels 45 and are appropriately joined at each end to the test chamber wall 13 to provide support for the vertical panels 45.

As indicated in FIG. 1, each of the ends 63 of the cryogenic fluid conduits 59 incorporated in the horizontal and vertical honeycomb panels are joined to flexible cryogenic conduit lines 85 that extend to vacuum-tight feedthrough couplings 87 in the test chamber wall 13. Proceeding externally of the chamber wall 13 from the couplings 87 are pairs of cryogenic fluid lines, such as 89 and 91, that are joined, respectively, to the opposite ends 63 of a conduit 59 through the internal flexible lines 85. The lines 89 connect to a circular manifold 93 through cutoff valves 95 and the lines 91 are similarly connected to a second manifold 97. The manifolds 93 and 97 communicate with adjoining cryogenic storage vessels 99 and 101 through lines 103 and 105, respectively.

OPERATION

When conducting a short duration rocket engine test the test model 29 is positioned in the test chamber 11 as shown in FIG. 1, and the chamber is evacuated by means of the pumps 15 and 19. Prior to firing the engine test model the honeycomb panels 43 and 45 are cryogenically cooled by passing cryogenic fluid, such as liquid nitrogen, through the conduits 59 of the panels. As indicated by the arrows in FIG. 1 the flow of cryogenic fluid is from the storage vessel 99 through the line 103 to the manifold 93 from where the fluid flows into the respective panels through the lines 89 and 85. After circulating through the panels the fluid returns to the manifold 97 through return lines 91 and from the manifold 97 to the storage vessel 101. Anytime the tank 101 becomes nearly full of fluid the direction of fluid flow may be reversed from that indicated in FIG. 1 by manipulating valves provided in the system for reversing the direction of flow.

When the honeycomb panels 43 and 45 are forming the energy-absorbing compartment 41 have been cryogenically cooled by the passage of liquid nitrogen therethrough the engine test model is fired producing a starting shock wave system that proceeds downstream in the energy-absorbing compartment 41. When this starting shock wave system contacts the honeycomb panels of the energy-absorbing compartment the exhaust gas will enter the cells 53 (FIGS. 4 and 5) of the panels and the gas molecules will follow a multiple deflection path typified in FIG. 5. It is noted that the cells 53 present a large cryogenically cooled surface area that confines the gas molecules and dissipates their energy and largely brings them to rest by multiple deflection against an extremely cold surface. It is desirable that the honeycomb cells 53 have a length (L) to diameter (D) ratio which is as high as the permissible thermal temperature gradient across the length of the cells will allow. Preferably the L/D ratio of the cells 53 should exceed 10.

The energy-absorbing capabilities of the cryogenically cooled honeycomb cells greatly diminishes the intensity of the shock wave reflection within the test chamber when compared with that experienced in prior art facilities. Thus, the useful test run time on short duration tests is increased several times since the starting shock wave does not return to the engine test model with sufficient force to invalidate the data received from instruments mounted on the model. Altitude pressure simulation is also notably improved due to the increased cryogenic pumping of gas molecules within the honeycomb cells 53.

We claim:
1. Rocket engine testing apparatus comprising:
   a vacuum-tight enclosure having means therein for mounting a test device that discharges a gaseous exhaust jet;
   means in communication with said enclosure for reducing the pressure within said enclosure to a desired test pressure;
   means within said enclosure for dissipating the energy of a gaseous exhaust discharge of a test device adapted to be mounted in said enclosure;
   said energy-dissipating means comprising metallic honeycomb cellular material, the honeycomb cells of said material being open on one side of said material and closed on the other side of said material;
   said side of said material having open honeycomb cells being generally directed toward the exhaust path of a test device adapted to be mounted in said enclosure;
   means for cryogenically cooling said honeycomb material.

2. The invention as defined in claim 1 wherein said honeycomb cellular material comprises a plurality of adjacent panels mounted within said enclosure, said panels forming an energy-absorbing compartment adapted to receive the exhaust gas from a test device.

3. The invention as defined in claim 2 wherein said honeycomb cellular material is aluminum, said closed side of said material comprising an aluminum heat sink backing plate for said cellular material.

4. The invention as defined in claim 3 wherein said cooling means comprises a cryogenic fluid conduit incorporated in each of said panels, said conduit being integral with said backing plate.

5. The invention as defined in claim 4 wherein each of said cryogenic fluid conduits comprises a plurality of continuous conduit lengths spaced transversely of said panel, each of said lengths extending throughout the length of said panel, both ends of said conduit being at the same end of said panel, a cryogenic fluid supply line connected to one of said ends and a cryogenic fluid return line connected to the other of said ends, a cryogenic fluid supply vessel located outside of said enclosure and communicating with said supply line, a cryogenic fluid return vessel located outside of said enclosure and communicating with said return line.

6. The invention as defined in claim 3 wherein said honeycomb cells of said material have a length to diameter ratio of at least 10.

7. The invention as defined in claim 3 wherein said honeycomb cellular material is bonded to said backing plate by an epoxy material mixed with aluminum powder.

8. The invention as defined in claim 2 wherein said enclosure comprises a longitudinal tank being circular in cross section, said energy-absorbing compartment being concentric within said tank, a plurality of said panels being disposed longitudinally of said tank and a plurality of said panels being disposed transversely of said tank.

9. The invention as defined in claim 2 wherein a radiation shield is disposed between said compartment and the outer wall of said enclosure.

10. The invention as defined in claim 2 wherein said means for mounting a test device in said enclosure comprises a tubular member located axially of said enclosure at one end thereof, said tubular member partially projecting into said energy-absorbing compartment.

* * * * *